(12) United States Patent
Mignani et al.

(10) Patent No.: US 8,759,469 B2
(45) Date of Patent: Jun. 24, 2014

(54) SYNTHESIS OF URETHANES AND POLYURETHANES CATALYSED BY CARBENES

(75) Inventors: Gerard Mignani, Lyons (FR); Mathias Destarac, Paris (FR); Daniel Taton, Camarsac (FR); Yves Gnanou, Talence (FR); Antoine Baceiredo, Toulouse (FR); Tsuyoshi Kato, Toulouse (FR); Fabien Bonnette, Ennezat (FR); Gopakumar Sivasankarapillai, Pullman, WA (US)

(73) Assignees: Vencorex Frence, Saint Priest (FR); Centre National de la Recherche Scientifique (C.N.R.S), Paris (FR)

( * ) Notice: Subject to any disclaimer, the term of this patent is extended or adjusted under 35 U.S.C. 154(b) by 1106 days.

(21) Appl. No.: 12/670,298

(22) PCT Filed: Jul. 25, 2008

(86) PCT No.: PCT/FR2008/051403
§ 371 (c)(1),
(2), (4) Date: Oct. 27, 2010

(87) PCT Pub. No.: WO2009/016322
PCT Pub. Date: Feb. 5, 2009

(65) Prior Publication Data
US 2011/0046301 A1      Feb. 24, 2011

(30) Foreign Application Priority Data
Jul. 25, 2007 (FR) ...................................... 07 56727

(51) Int. Cl.
*C08G 18/08* (2006.01)
*C08G 18/18* (2006.01)

(52) U.S. Cl.
USPC .................. 528/53; 528/48; 528/52; 528/54; 528/60; 528/76; 528/80; 528/85

(58) Field of Classification Search
CPC .................................................. C08G 18/2036
USPC .................. 528/48, 53, 54, 52, 60, 76, 80, 85
See application file for complete search history.

(56) References Cited

U.S. PATENT DOCUMENTS

| 5,990,340 A | 11/1999 | Haider et al. | |
|---|---|---|---|
| 2005/0143478 A1 | 6/2005 | Sakai et al. | |
| 2008/0038461 A1* | 2/2008 | Lekovic et al. | 427/230 |
| 2008/0262186 A1* | 10/2008 | Louie et al. | 528/53 |

FOREIGN PATENT DOCUMENTS

WO   WO 2005/113626 A2   12/2005

OTHER PUBLICATIONS

"Efficient Transesterification/Acylation Reactions Mediated by N-Heterocyclic Carbene Catalysts." Nolan et al. J. Org. Chem. 2003, 68, 2812-2819.*
Bourissou et al., "Stable Carbenes," Chem. Rev. 2000, vol. 100, pp. 39-91.
Denk et al., "Synthesis and reactivity of subvalent compounds Part 11. Oxidation, hydrogenation and hydrolysis of stable diamino carbenes," Journal of Organometallic Chemistry, 617-618, (2001) 242-253.
Otto et al., "Mono- and Diaminocarbenes from Chloroiminium and -amidinium Salts: Synthesis of Metal-Free Bis (dimethylamino)carbene," J. Am Chem. Soc. 2004, 126, 1016-1017.
Arduengo, III et al., "A Stable Crystalline Carbene," J. Am. Chem Soc., vol. 113, 1991, pp. 361-365.
International Search Report Re: PCT/FR2008/051403 dated Feb. 18, 2009.
P. Ardaud, et al. "Waterborne and solvent based surface coatings and their application", ISBN 0471 078868, vol. III: Polyurethanes, Sita Technology Ltd., 1998.
D.K. Chattopadhyay, et al. "Structural Engineering of Polyurethanes Coatings for High Performance Application", Progress in Polymer Science, vol. 32, No. 3, pp. 352-418, 2007.
N. Scott, et al. "Interaction of a Bulky N-Heterocyclic Carbene Ligand with Rh(I) and Ir(I), Doublr C—H Activation and Isolation of Bare 14-Electron Rh(III) and Ir(III) Complexes", Journal of American Chemistry Society, vol. 127, pp. 3516-3526, 2005.

* cited by examiner

*Primary Examiner* — Michael L Leonard
(74) *Attorney, Agent, or Firm* — Michael B. Fein, Esq.; Eckert Seamans Cherin & Mellott, LLC

(57) ABSTRACT

The present invention relates to a process for preparing a compound comprising at least a urethane group —HN—C(=O)—O, said process comprising a step (E) in which a compound (I) comprising at least an isocyanate functional group —N=C=O is reacted with an organic compound (II) carrying at least a hydroxyl group —OH, said reaction being carried out in a presence of a carbene (III) used as a catalyst.

19 Claims, No Drawings

SYNTHESIS OF URETHANES AND POLYURETHANES CATALYSED BY CARBENES

CROSS-REFERENCE TO RELATED APPLICATIONS

This application is a national stage application under 35 U.S.C. 371 of International Application Number PCT/FR2008/051403, filed Jul. 25, 2008, which claimed priority from French application number 07 56727, filed Jul. 25, 2007, benefit of which applications is hereby claimed and which are hereby incorporated by reference in their entirety.

BACKGROUND OF THE INVENTION

The present invention relates to a process for preparing compounds carrying at least a urethane functional group by reacting compounds carrying isocyanate functional groups and compounds carrying hydroxyl groups, this process being specifically adapted to the synthesis of polyurethanes.

The formation of a urethane functional group (divalent functional group of formula —O—C(=O)—NH—, also known as a carbamate functional group) by reacting a hydroxyl group (—OH) and an isocyanate functional group (—N=C=O) is a well-known reaction which has been the subject of numerous publications. It is generally acknowledged that it implements the following formation mechanism:

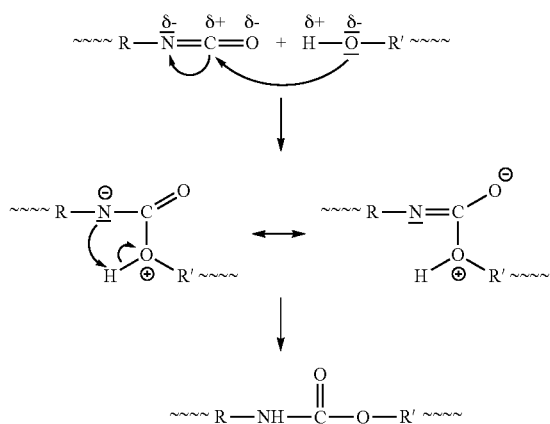

By using compounds carrying at least two isocyanate groups and compounds carrying at least two hydroxyl groups in the above reaction, polymerisation takes place which leads to polyurethanes comprising a succession of units of the type [—R—NH—CO—O—R'—O—CO—NH—].

The aforementioned reactions for forming urethane functional groups are admittedly generally, perhaps even completely, quantitative and are most often carried out at ambient temperature or above, especially when primary or secondary alcohols are used as hydroxyl compounds (and more specifically when primary alcohols are used). However, it is generally advised to catalyse these reactions, particularly in the case of reactions in which polyurethanes are formed.

Especially, the reaction is catalysed so as to minimise any side reactions which may produce unwanted by-products. In fact, the isocyanate functional group, which is very reactive, reacts very easily not only with the —OH groups, but also with all the nucleophilic species carrying labile protons present in the reaction medium. In particular, the isocyanate functional groups are likely to react with water to form an unstable carbamic acid which breaks down into amine. The amine thus formed may subsequently react with another isocyanate group so as to form a urea which, in turn, may add onto another isocyanate group to form a biuret.

In order to catalyse reactions forming urethane functional groups, and especially, polyurethane synthesis reactions, it has been suggested inter alia, to use organometallic catalysts, especially organometallic compounds based on metals such as tin, similar to those described, for example, in "*Waterborne & Solvent Based Surface Coatings and their Applications*", ISBN 0471 078868, Volume III: *Polyurethanes*, P. Ardaud, E. Charrière-Perroud, C. Varron, edited by P. Thomas, and published in 1998 by SITA Technology Ltd., or else in the article "*Structural engineering of polyurethane coatings for high performance applications*" from *Progress in Polymer Science*, Volume 32, Issue 3, pages 352-418 D. K. Chattopadhyay and K. V. S. N. Raju (March 2007).

These catalysts based on tin-type metals have proven unsatisfactory, particularly when it is sought to catalyse a polyurethane synthesis reaction. In fact, these catalysts exhibit high toxicity which means they must be handled in a controlled manner, in particular so as to avoid any negative impact on the environment.

Furthermore, the metals of these catalysts are also likely to pollute the synthesized urethanes, which would be particularly problematic if polymer compositions are synthesized, in which case the metals tend to become trapped in a relatively irreversible manner, thus compromising numerous potential applications of the polymer compositions obtained.

SUMMARY OF THE INVENTION

One aim of the present invention is to provide a new means for catalysing the aforementioned reaction for forming a urethane functional group, in particular making it possible to effectively catalyse a polyurethane synthesis reaction but avoiding the drawbacks associated with the use of catalysts based on metals such as tin.

To this end, the present invention provides a process for preparing a compound comprising at least a urethane group —HN—C(=O)—O, said process comprising a step (E) in which a compound (I) comprising at least an isocyanate functional group —N=C=O (also referred to as —NCO in the following description) is reacted with an organic compound (II) carrying at least a hydroxyl group —OH, this reaction being carried out in the presence of a carbene (III) used as a catalyst.

In accordance with another aspect, the invention also relates to the use of a carbene as a catalyst when reacting a compound (I) comprising at least an isocyanate functional group —N=C=O with an organic compound (II) carrying at least a hydroxyl group —OH, so as to form a compound comprising at least a urethane group —HN—C(=O)—O.

The invention also relates to a kit for preparing a compound comprising at least a urethane group —HN—C(=O)—O, said kit including:

a compound (I) comprising at least an isocyanate functional group —N=C=O, contained in a first vessel;

an organic compound (II) carrying at least a hydroxyl group —OH, separate from the compound (I) and contained in a second vessel which is different from the first vessel, said compound (II) being isolated from the compound (I);

a carbene contained in a vessel which may be the first vessel, the second vessel or else a third vessel which is different from the other two vessels.

This kit may be used to carry out the aforementioned step (E) by mixing all the contents of the vessels of the kit.

In accordance with a possible embodiment, the kit may include:

a first vessel (R1) containing a compound (I) comprising at least an isocyanate functional group —N=C=O together with a carbene;

a second vessel (R2) containing an organic compound (II) carrying at least a hydroxyl group —OH, separate from the compound (I).

Alternatively, in accordance with another possible embodiment, the kit may comprise:

a first vessel (R1') containing a compound (I) comprising at least an isocyanate functional group —N=C=O;

a second vessel (R2') containing an organic compound (II) carrying at least a hydroxyl group —OH together with a carbene, said compound (II) being separate from the compound (I).

Within the meaning of the present description, the term "carbene" denotes a chemical species which is generally electrically neutral and comprises a divalent carbon having two non-bonding electrons, said two non-bonding electrons preferably being in paired form (singlet), but also possibly being in unpaired form (triplet). Usually, a carbene within the meaning of the invention is a carbene within the conventional meaning of the term, i.e. a species comprising 6 valence electrons and having no electrical charge. However, within the meaning where it is used in this document, the concept of a carbene also includes compounds of the aforementioned type, in which the divalent carbon carries an additional electronic doublet or is otherwise involved in a delocalized bond and/or in which the divalent carbon bears an electrical charge (typically a negative charge which may be delocalized).

Within the scope of the present invention, the inventors have made evident that a carbene as defined above is an effective catalyst when reacting an isocyanate group with a hydroxyl group. Without wanting to be rigidly bound to any specific theory, the inventors' results indicate that the carbene seems to activate the reactivity of the carbonyl functional group of the isocyanate in a particularly effective manner, the carbene presumably intensifying the electrophilic nature of the carbon.

In addition to the fact that it doesn't possess the toxicity of tin-based organometallic catalysts, the carbene used according to the invention also has the advantage of enabling catalysis at low temperatures, for example at ambient temperature, the carbene generally not requiring thermal activation. Step (E) of the process of the invention may thus generally be carried out at a temperature ranging from 10 to 80° C., this temperature generally being less than or equal to 70° C., and usually being less than or equal to 60° C. Typically, step (E) is carried out at a temperature ranging from 15 to 60° C., for example at approximately 40 to 50° C.

The process of the invention may advantageously be carried out in order to prepare polyurethanes.

In this regard and in accordance with a first, adapted embodiment, step (E) of the process of the invention makes use of:

compounds (I) comprising at least a compound carrying at least two isocyanate groups NCO (optionally a mixture with compounds (I) carrying a single isocyanate functional group), and compounds (II) comprising at least a compound carrying at least two hydroxyl groups —OH (optionally mixed with compounds (I) carrying a single functional group —OH).

DETAILED DESCRIPTION

According to this first embodiment, compounds (I) carrying at least two isocyanate groups —NCO may for example be reacted in step (E) with compounds (II) carrying at least two hydroxyl groups —OH.

In accordance with a second, more specific embodiment, the polyurethanes according to the invention may be prepared by carrying out step (E) using a single type of compound as compounds (I) and (II), hereinafter referred to as compound (I/II) carrying at least an NCO group and at least an OH group. The compound (I/II) used in accordance with this variant cannot generally be stored as it is since it is often likely that the NCO and OH functional groups will react with one another. Consequently, when compounds (I/II) are used in the process of the invention, they are preferably formed in situ from precursors, for example from precursors comprising functional groups —OH and a functional group —NCO in protected form (for example a functional group —NCO protected by a phenol or an oxime, whereby the compounds of formula (I/II) is formed by thermal activation which leads to the functional group —NCO becoming unprotected).

In accordance with this second, very specific embodiment, polymerisation is obtained by adding the compounds (I/II) to one another, which also leads to polyurethane-type polymers. However, the polyurethanes obtained by using the above specific compounds (I/II) have a specific structure which is different from that of the polyurethanes of the previous variant, more specifically they have urethane linkings which are all oriented in the same direction (of the type —O—C(=O)—NH—O—C(=O)—NH—) instead of head-to-tail linkings which are usually observed in the case of polyurethanes (of the type —O—C(=O)—NH—NH—C(=O)—O—).

The inventors have also made evident that, when used to prepare polyurethane polymers, the process of the invention makes it possible to selectively obtain either solubilisable polyurethanes (generally having a linear or very slightly branched structure) or insolubilisable polyurethanes (having a complex three-dimensional structure which may be crosslinked or gelified).

Herein, a "solubilisable polyurethane" denotes a polymer which can produce a monophase solution (generally transparent) when added to a suitable solvent, the viscosity of said solution being variable as a function of the amount of solvent used. A solubilisable polymer of this type generally has a linear structure, that is to say a substantially one-dimensional structure, basically formed by a linear linking of divalent monomer units joined together by urethane functional groups. However, some soluble polymers may have a low degree of branching, a branching not necessarily impeding the soluble nature of the polymer.

By contrast, an "insolubilisable polyurethane" refers to a polymer which is not soluble in any solvent and with generally comprises a linking of monomer units, at least some of which are trivalent, joined together by urethane functional groups and usually in the form of compositions having a complex structure, typically gelified and/or crosslinked, which renders them insoluble.

Obtention of linear or, inversely, three-dimensional polyurethanes may be controlled in accordance with the invention by suitable selection of parameters for carrying out step (E) of the process, in particular including the degree of functionalisation of the monomers, the order in which the compounds (I), (II) and (III) are added to the reaction medium and, in some cases, the amount of carbene introduced and possibly the temperature.

More precisely, depending on the nature of the polymer which it is sought to synthesize, the process of the invention is preferably carried out under the following conditions:

When it is Sought to Synthesize Solubilisable Polyurethanes:

Although not required systematically, it is preferable in this connection, to use difunctional compounds in step (E) of the process as compounds (I) and (II), optionally together with monofunctional compounds, but with the exclusion of compounds carrying more than two functional groups —OH and/or —NCO within the same molecule. In other words, in each of the compounds present, the sum of the number of functional groups —NCO and of the number of functional groups —OH in the medium of step (E) is preferably equal to 2 at most. Compounds (I) carrying precisely 2 isocyanate groups are thus generally used and reacted with compounds carrying precisely 2 hydroxyl groups. Alternatively and in accordance with a specific embodiment, a single type of monomer may be used as compounds (I) and (II), that is to say compounds carrying both a single functional group —NCO and a single functional group —OH.

In accordance with an advantageous embodiment for synthesizing solubilisable polyurethanes, difunctional compounds are used as compounds (I) and (II), optionally together with monofunctional compounds, and step (E) includes the addition of compounds (I) to a starter, said starter containing:

compounds (II) carrying hydroxyl groups —OH; and
a carbene (III).

Within the more specific scope of using aromatic compounds (I) (for example in toluene diisocyanate), the inventors have also noted that, in particular in order to avoid crosslinking and/or gelification, it is also preferable to carry out the process under specific conditions, including the two non-limiting, preferred variants described below:

First Variant used for Aromatic Compounds (I):
Order of Addition of Compounds: (II)+(III), then (I) with a Controlled Amount of Catalyst Introduced In accordance with this first variant which makes it possible to obtain solubilisable polyurethanes from aromatic compounds (I), step (E) of the process includes adding an aromatic compound (I) comprising precisely two isocyanate groups —NCO to a starter in which a compound (II) comprising precisely two hydroxyl groups —OH has previously been mixed with a carbene (III), the carbene:NCO molar ratio of the total amount of carbene introduced relative to the total amount of isocyanate functional groups —NCO introduced being less than 0.002, advantageously less than 0.0015, more preferably less than or equal to 0.001 (for example between 0.0001 and 0.001).

Within the scope of this first variant, it has proven necessary to use a limited amount of carbene catalyst. The inventors have, in fact, demonstrated that in accordance with this variant of the process, a greater amount of catalyst induces gelification of the reaction medium, which is probably caused by crosslinking of the isocyanate functional groups, this gelification also proving to be faster, the greater the aforementioned carbene:NCO ratio. The carbene:NCO ratio limit at which gelification is first observed naturally depends on the precise nature of the compounds (I) and (II) used. However, in the majority of cases, gelification is avoided by staying within the above preferred ranges of carbene:NCO ratio, in particular when this ratio is less than 0.0015.

Furthermore, in order to avoid gelification of the medium however, it is preferable in accordance with this specific variant of the process to carry out step (E) at a low temperature, preferably below 40° C., more preferably below 30° C., and typically between 15 and 25° C.

In accordance with this first variant, the aromatic compounds (I) comprising precisely two isocyanate groups and (II) comprising precisely two hydroxyl groups may optionally be used together with monofunctional compounds (in particular monoalcohols), but in accordance with this variant the use of compounds carrying more than two functional groups —OH and/or —NCO within the same molecule is excluded. In accordance with a specific embodiment of the first variant, only aromatic compounds (I) comprising precisely two isocyanate groups and compounds (II) comprising precisely two hydroxyl groups are used, other compounds carrying hydroxyl and/or isocyanate functional groups being excluded.

Second Variant Used for Aromatic Compounds (I):
Order of Addition of Compounds: (I)+(II) First, then (III)

In accordance with this second variant, which makes it possible to obtain solubilisable polyurethanes from aromatic compounds (I), the process of the invention comprises a step) ($E^0$) prior to step (E), in which aromatic compounds (I) having precisely two isocyanate groups —NCO are reacted with compounds (II) having precisely two hydroxyl groups —OH in the absence of carbene (III) (and usually, if not systematically, in the absence of any catalyst), step (E) then being carried out by adding the carbene (III) to the medium obtained at the end of step ($E^0$), optionally with the joint addition of additional compounds (I) and/or (II), which may be the same as or different from those used in step ($E^0$).

In step ($E^0$) of this second specific variant, prepolymers (PNCO) carrying two end isocyanate groups and/or prepolymers (POH) carrying two end hydroxyl groups are generally formed. The prepolymers PNCO are able to act as diisocyanate compounds in step (E), as well as the compounds (I). Likewise, the prepolymers (POH) are able to act as dihydroxylated compounds in step (E), as well as the compounds (II).

The inventors have now demonstrated that, by using the specific conditions of the second variant, it is possible to prevent gelification.

Within the scope of this second variant, it has proven advantageous to carry out step (E) with a carbene:NCO molar ratio of the total amount of carbene introduced relative to the total amount of isocyanate functional groups —NCO introduced of less than 0.05, advantageously less than 0.02, more preferably less than or equal to 0.01, for example between 0.001 and 0.01.

In addition, it often proves advantageous to carry out steps ($E^0$) and (E) of this second variant at a temperature lower than or equal to 60° C., preferably lower than 50° C., more preferably lower than 30° C., for example between 15 and 30° C.

In this case also, the aromatic compounds (I) comprising exactly two isocyanate groups and (II) comprising precisely two hydroxyl groups may optionally be used together with monofunctional compounds (in particular monoalcohols), but in accordance with this variant the use of compounds carrying more than two functional groups —OH and/or —NCO within the same molecule is excluded. In accordance with a specific embodiment of the second variant, only aromatic compounds (I) comprising precisely two isocyanate groups and compounds (II) comprising precisely two hydroxyl groups are used, other compounds carrying hydroxyl and/or isocyanate functional groups being excluded.

The synthesis of solubilisable polyurethanes according to the invention, especially by the preferred variants described above, may advantageously be used to prepare thermoplastic polyurethanes, for example thermoplastic polyurethanes comprising alternate rigid and soft monomer units.

More specifically the above variant, using the succession of steps (E⁰) and (E), may advantageously be used to synthesize linear polyurethanes having a sequenced structure ("block" copolymers). For this purpose the compounds (I) and (II) are typically used in step (E⁰) with a NCO:OH molar ratio corresponding to the number of isocyanate groups introduced relative to the number of hydroxyl groups introduced greater than 1 (for example with a NCO:OH molar ratio between 0.8 and 1.2) and, in step (E), dihydroxyl compounds (II) different from those of step (E⁰) are added. Under these conditions, polymer "cores" are created schematically in step (E⁰), onto which polymer chains ("terminal branches" or "inter-core links") are grafted, these chains being of a different chemical nature compared to that of the cores.

When it is Sought to Obtain Insolubilisable Polyurethanes

A simple solution for achieving this result involves using, in step (E) of the process:

compounds (I) including polyfunctional compounds comprising at least 3 isocyanate groups —NCO (optionally together with compounds having only one or two groups —NCO); and/or compounds (II) including polyfunctional compounds comprising at least 3 groups —OH (optionally together with compounds having only one or two groups —OH).

In the specific cases wherein aromatic compounds (I) are used, another solution for obtaining insolubilisable polyurethanes involves using the First Variant as described above in the present description to synthesize solubilisable polymers, but in this case using a greater amount of catalyst, in such a way that conditions prevail in which the carbene:NCO molar ratio is greater than the limit value at which crosslinking is first observed. Generally, the desired result is obtained when a ratio greater than 0.003 is used, this ratio advantageously being greater than or equal to 0.005.

Especially, the preparation of insolubilisable polyurethanes (gelified or crosslinked) in accordance with the process of the invention may be used to synthesize soft or rigid foams. For this purpose and in accordance with methods which are well-known within the field (described in particular in "*Waterborne & Solvent Based Surface Coatings and their Applications*", ISBN 0471 078868, Volume III: *Polyurethanes*, P. Ardaud, E. Charrière-Perroud, C. Varron, edited by P. Thomas, and published in 1998 by SITA Technology Ltd., or else in "Structural engineering of polyurethane coatings for high performance applications" *Progress in Polymer Science*, Volume 32, Issue 3, pages 352-418 D. K. Chattopadhyay and K. V. S. N. Raju (March 2007)), it is typically possible to use porogenic agents, generate carbonic anhydride in situ by the controlled addition of water to an excess of diisocyanate, or else to use a volatile solvent, such as trichlorofluoromethane, or CH2Cl2 and to vaporise it by heating.

Various specific features and preferred embodiments of the process of the invention will now be described in greater detail.

The Carbene (III) Used

The carbene (III) used in step (E) of the process of the invention is specifically used as a catalyst when reacting an isocyanate group carried by a compound (I) with a hydroxyl group carried by a compound (II).

Usually, the reaction medium of step (E) does not contain any catalyst other than the carbene (III). Especially, this reaction medium usually does not contain any organometallic catalysts.

It should also be noted that all the carbenes present in the reaction medium of step (E) are generally available as a catalyst and that, usually, none of the carbenes present act, for example, as a ligand in an organometallic complex.

With regard to their exact chemical nature, it should be noted that the majority of carbenes make it possible to obtain the results which are desired within the scope of the present application. However, the carbene (III) used in step (E) of the process of the invention advantageously has at least one of the preferred characteristics detailed below.

The carbene (C) used preferably comprises, in a of its divalent carbon, a heteroatom selected from N, S, P, Si and O. In this regard, the carbene (III) advantageously corresponds to the following general formula (III-1):

in which:

X and Y may be the same or different and are heteroatoms selected from N, S, P, Si and O;

nx and ny are two integers which are respectively equal to the valence of the heteroatom X and the valence of the heteroatom Y (that is to say 2 when the heteroatom is S or O; 3 when the heteroatom is N or P; and 4 when the heteroatom is Si)

each of the groups $R^X$ and $R^Y$ linked to the heteroatoms X and Y represents, independently of the other groups, a hydrocarbon chain which is linear or branched, optionally cyclised in part or completely, and optionally substituted, this chain preferably being:

a linear or branched alkyl, alkenyl or alkynyl group which is optionally substituted, for example by at least a perfluoroalkyl group, a linear or branched perfluoroalkyl group;

a cycloalkyl group which is optionally substituted, for example by at least an alkyl or alkoxy group;

an aryl group which is optionally substituted, for example by at least an alkyl or alkoxy group;

an alkylaryl or arylalkyl group in which the aryl portion is optionally substituted, for example by at least an alkyl or alkoxy group, wherein one of the groups $R^X$ carried by the heteroatom X and one of the groups $R^Y$ carried by the heteroatom Y may optionally be joined together to form a heterocycle with the heteroatoms X and Y and the divalent carbon carrying two non-bonding electrons. In this case, the heterocycle thus formed preferably comprises from 5 to 7 bonds.

Advantageously, the carbene (III) is a carbene corresponding to the general formula (III-1) above, wherein X denotes a nitrogen atom. The carbene used is thus a carbene known as NHC (N-heterocyclic carbene).

In accordance with a specifically advantageous embodiment, the carbene (III) is a carbene NHC of the aforementioned type corresponding to one of the following general formulae (I-1.1) or (I-1.1'):

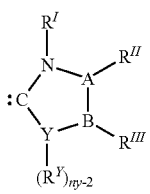
(III-1.1)

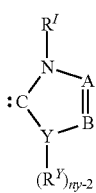
(III-1.1')

in which:
Y is a heteroatom selected from N, S, P, Si and O, Y preferably being a nitrogen atom;
ny and $R^Y$ have the aforementioned definitions; and
$R^I$ denotes a hydrocarbon chain which is linear or branched, optionally cyclised in part or completely, and optionally substituted, this chain preferably being:
  a linear or branched alkyl, alkenyl or alkynyl group which is optionally substituted, for example by at least a perfluoroalkyl group,
  a linear or branched perfluoroalkyl group;
  a cycloalkyl group which is optionally substituted, for example by at least an alkyl or alkoxy group;
  an aryl group which is optionally substituted, for example by at least an alkyl or alkoxy group;
  an alkylaryl or arylalkyl group in which the aryl portion is optionally substituted, for example by an alkyl or alkoxy group,
A denotes a nitrogen atom or a $CR^{IIa}$ group;
B denotes a nitrogen atom or a $CR^{IIIa}$ group;
$R^{II}$ and $R^{III}$, and optionally $R^{IIa}$ and $R^{IIIa}$ which may the same or different, each denote a hydrogen atom or else a hydrocarbon chain which is linear or branched, optionally cyclised in part or completely, and optionally substituted. When $R^{II}$, $R^{III}$, $R^{IIa}$ or $R^{IIIa}$ represent a hydrocarbon chain, this hydrocarbon chain is preferably:
  a linear or branched alkyl, alkenyl or alkynyl group which is optionally substituted, for example by at least a perfluoroalkyl group,
  a linear or branched perfluoroalkyl group;
  a cycloalkyl group which is optionally substituted, for example by at least an alkyl or alkoxy group;
  an aryl group which is optionally substituted, for example by at least an alkyl or alkoxy group;
  an alkylaryl or arylalkyl group in which the aryl portion is optionally substituted, for example by at least an alkyl or alkoxy group, In accordance with an embodiment which is even more advantageous, the carbene (III) used corresponds to one of the following general formulae (III-1.1a) or (III-1.1a'):

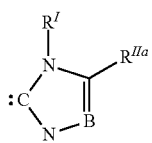
(III.1.1a)

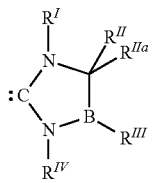
(III-1.1a')

in which:
$R^I$, $R^{II}$, $R^{IIa}$, $R^{III}$ and B are as defined above; and
$R^{IV}$ denotes a hydrocarbon chain which is linear or branched, optionally cyclised in part or completely, and optionally substituted, said chain preferably being:
  a linear or branched alkyl, alkenyl or alkynyl group which is optionally substituted, for example by at least a perfluoroalkyl group,
  a linear or branched perfluoroalkyl group;
  a cycloalkyl group which is optionally substituted, for example by at least an alkyl or alkoxy group;
  an aryl group which is optionally substituted, for example by at least an alkyl or alkoxy group;
  an alkylaryl or arylalkyl group in which the aryl portion is optionally substituted, in particular by at least an alkyl or alkoxy group In a particularly beneficial manner, the carbene (III) corresponds to the above formula (III-1.1a).

Alternatively and in accordance with another conceivable embodiment, the carbene (III) may be a compound selected from the following compounds:
phosphino(amino)carbenes of formula (III.2):

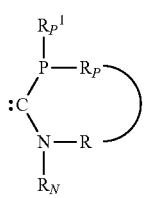
(III.2)

bis(phosphino)carbenes of formula (III.3):

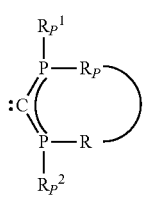
(III.3)

carbodiphosphoranes corresponding to one of the following mesomeric formulae (III.4) or (III.4')

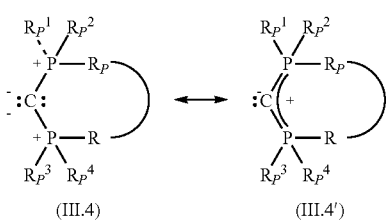

(III.4)          (III.4')

where each of the groups R, $R_P$, $R_P^1$, $R_P^2$, $R_P^3$, $R_P^4$, $R_N$, and $R_P1$ represents, independently of the other groups, a hydrocarbon chain which is linear or branched, optionally cyclised in part or completely, and optionally substituted, said chain preferably being:

- a linear or branched alkyl, alkenyl or alkynyl group which is optionally substituted, for example by at least a perfluoroalkyl group,
- a linear or branched perfluoroalkyl group;
- a cycloalkyl group which is optionally substituted, for example by at least an alkyl or alkoxy group;
- an aryl group which is optionally substituted, for example by at least an alkyl or alkoxy group;
- an alkylaryl or arylalkyl group in which the aryl portion is optionally substituted, for example by at least an alkyl or alkoxy group wherein, in each of the formulae (III.2), (III.3), (III.4) and (III.4'), the group R and the group $R^P$ may optionally be joined together to form a heterocycle with the two heteroatoms to which they are linked and the divalent carbon (the heterocycle thus formed optionally preferably comprising from 5 to 7 bonds).

In accordance with yet another possible embodiment, the carbene (III) used according to the invention is a carbene having an alkylaminocyclic pattern, known as a CAAC (cyclic alkylaminocarbene), and of the type of those described, for example, in application WO 2006/138166 which discloses the method for preparing these compounds. In this regard, the carbene (III) advantageously corresponds to the following formula (III-5):

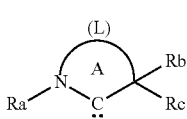

(III-5)

where:
- A is a cycle comprising from 4 to 7 atoms, of which at least one of the atoms is a nitrogen atom as shown,
- L is a divalent group comprising from 1 to 4 carbon atoms, of which one or more atoms may be substituted by an oxygen, nitrogen or silicon atom, the available valences possible being substituted,
- Ra represents an alkyl, alkenyl, alkynyl, cycloalkyl, aryl or aralkyl group,
- $R_b$ and $R_c$ are the same or different and represent an alkyl, alkenyl, alkynyl, cycloalkyl, aryl, aralkyl, alkoxy, alkenyloxy, alkynyloxy, aryloxy or alkoxycarbonyl group, or else $R_b$ and $R_c$ are joined together to form a spirocycle, the portion of the cycle carrying the two groups $R_b$ and $R_c$ linked together comprising from 3 to 12 atoms.

Carbenes of the CAAC type preferably used in the present invention correspond to the above formula (III-5) in which A represents a cycle of 5 or 6 atoms and L represents a divalent group comprising 2 or 3 atoms.

In the compounds of formula (III-5), if one of the groups Ra, Rb or Rc comprises a cycle, it may be substituted by one or more, for example two, substituents. The substituent may be of any nature, provided this group does not interfere with the reaction catalysed by the carbene.

Furthermore, L is a divalent group comprising from 1 to 4 atoms, of which one or more atoms may be substituted by an oxygen, nitrogen or silicon atom, the valences available optionally being substituted. This means that a hydrogen atom present on an atom may be replaced by a substituent.

Preferred examples of substituents on the groups L, Ra, Rb or Rc of formula (III-5) include, inter alia, the alkyl, alkenyl, alkynyl, cycloalkyl, aryl, aralkyl and amino groups, amino substituted by alkyl or cyclolalkyl groups, a nitrile or haloalkyl group, preferably perfluoromethyl.

Within the scope of the present description, the term "alkyl" means a linear or branched $C_1$-$C_{15}$ hydrocarbon chain, preferably a $C_1$-$C_{10}$ hydrocarbon chain and even more preferably a $C_1$-$C_4$ hydrocarbon chain. Examples of preferred alkyl groups are, in particular, methyl, ethyl, propyl, isopropyl, butyl, isobutyl and t-butyl.

"Alkoxy" denotes an alkyl-O-group in which the term alkyl has the meaning given above. Preferred examples of alkoxy groups are methoxy or ethoxy groups.

"Alkoxycarbonyl" refers to the alkoxy-C(O)-group in which the alkoxy group has the definition given above.

"Alkenyl" means a linear or branched hydrocarbon chain comprising a double $C_2$-$C_8$ bond, preferably a double $C_2$-$C_6$ bond and even more preferably a double $C_2$-$C_4$ bond. Examples of preferred alkenyl groups include, in particular, the vinyl, 1-propenyl, 2-propenyl, isopropenyl, 1-butenyl, 2-butenyl, 3-butenyl and isobutenyl groups.

"Alkynyl" means a linear or branched hydrocarbon chain comprising a triple $C_2$-$C_8$ bond, preferably a triple $C_2$-$C_6$ bond and even more preferably a triple $C_2$-$C_4$ bond. Examples of preferred alkynyl groups include, in particular, the ethynyl, 1-propynyl, 1-butynyl and 2-butynyl groups.

"Alkenyloxy" and "alkynyloxy" respectively denote an alkenyl-O- and alkynyl-O-group, in which the terms alkenyl and alkynyl have the meaning given above.

"Cycloalkyl" means a cyclic or monocyclic $C_3$-$C_8$ hydrocarbon group, preferably a cyclopentyl or cyclohexyl or polycyclic (bi- or tricyclic) $C_4$-$C_{18}$ group, in particular adamantyl or norbornyl.

"Aryl" means an aromatic mono- or polycyclic group, preferably a mono- or bicyclic $C_6$-$C_{20}$ group, preferably phenyl or naphthyl. If the group is polycyclic, i.e. if it comprises more than one cyclic nucleus, the cyclic nuclei may be condensed in pairs or connected in pairs by bonds σ. Examples of ($C_6$-$C_{18}$) aryl groups are, in particular, phenyl and naphthyl.

"Aryloxy" denotes an aryl-O-group in which the aryl group has the meaning given above.

"Arylalkyl" means a linear or branched hydrocarbon group carrying a monocyclic aromatic $C_7$-$C_{12}$ cycle, preferably benzyl, the aliphatic chain comprising 1 or 2 carbon atoms.

Specific examples of carbenes of formula (III-5) are carbenes corresponding to the following formulae (III-5a) and (III-5b):

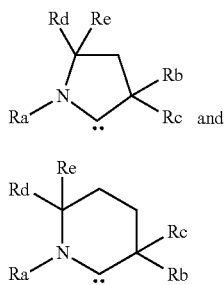

(III-5a)

(III-5b)

where:
- Ra, Rb and Rc have the meanings given for general formula (III-5),
- Rd and Re are the same or different and represent an alkyl, alkenyl, alkynyl, cycloalkyl, aryl or aralkyl group.

Beneficial carbenes of the CAAC type are carbenes of formula (III-5a) or (III-5b), in which:
- Ra is an alkyl group, an optionally substituted aryl group, preferably an optionally substituted phenyl group;
- Rb and Rc are the same or different and represent an alkyl group, an optionally substituted aryl group, preferably an optionally substituted phenyl group;

or else $R_1$ and $R_2$ are linked together to form a cycloalkane;
- Rd and Re are the same or different and represent an alkyl group.

Preferably, it is also possible to use carbenes of formula (III-5a) or (III-5b), in which:
- Ra represents a tert-butyl group, a phenyl group, a phenyl group substituted by one to three alkyl groups having from 1 to 4 carbon atoms,
- Rb and Rc are the same or different and represent a linear or branched alkyl group having from 1 to 4 carbon atoms or a phenyl group, or else $R_1$ and $R_2$ are linked together to form a cyclopentane or a cyclohexane,
- Rd and Re are the same or different and represent a linear or branched alkyl group having from 1 to 4 carbon atoms.

Illustrative examples of beneficial CAAC carbenes according to the invention thus include, in particular, the following compounds:

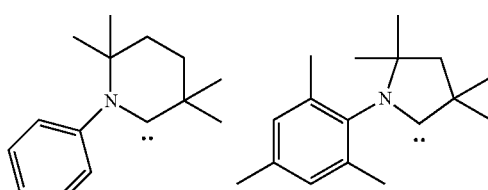

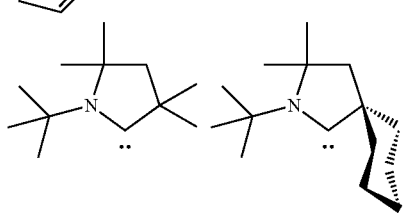

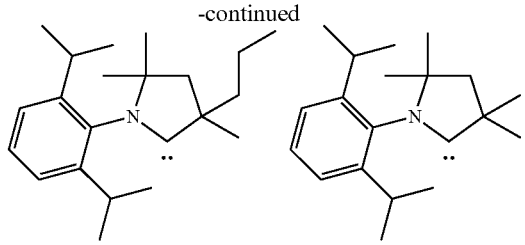

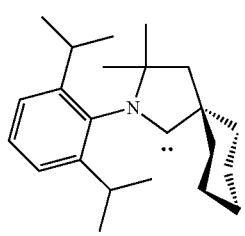

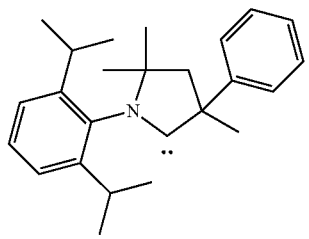

Irrespective of its precise nature, the carbene (III) used in the process of the invention may be a carbene which was preformed in a step prior to step (E). In this case, it is said to be a "naked" carbene which is generally stored in an inert and unreactive (generally anhydrous) atmosphere before step (E) is carried out, typically in nitrogen or argon, generally in a glove box, usually in a solvent medium such as toluene.

Alternatively, the carbene (III) may be formed in situ in the medium of step (E), from at least one precursor (PC) of said carbene ('masked' form of the carbene). In this case, the carbene precursor used may be selected, in particular, from at least one of the following precursors:

a carbene in dimerised form which is split into two carbenes in situ by thermal activation, this dimerised carbene advantageously corresponding to the following formula ($PC_D$):

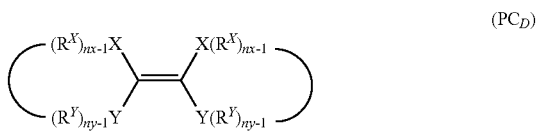

where X, Y, nx, ny, $R^X$ and $R^Y$ have the above definitions;

an imidazolium salt, which forms a carbene in situ by reaction with a base. In particular, the base used may be a tertiary amine (such as triethylamine) or else an alcoholate (in particular tBuOK) or else an alkyl lithium (such as BuLi). The imidazolium salts used as carbene precursors in accordance with the invention advantageously correspond to one of the following formulae ($PC_S$) or ($PC_S'$):

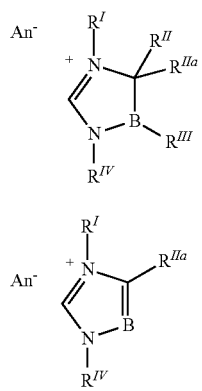

in which:

B, $R^I$, $R^{II}$, $R^{III}$ and $R^{IV}$ have the above definitions and $An^-$ is an anion derived from a Brönsted acid, advantageously a carboxylate, sulfate, hydrogen sulfate, sulfonate, phosphate, hydrogenphosphate, halide, perchlorate or borate anion;

an adduct of carbene and alcohol which releases the carbene in situ when thermally treated.

In accordance with a specific embodiment, the carbene used may be an encapsulated carbene, i.e. mixed physically with a polymer acting as a protective matrix. Advantageously, the protective polymer used in this case is a silicone oil.

Compounds (I) Carrying Isocyanate Groups

Numerous compounds carrying isocyanate groups may be used as compounds (I) within the scope of the present invention.

Generally, it is preferred to use solubilisable compounds (I) of low molecular mass. However, in accordance with some specific embodiments, it is also conceivable to use larger molecules as compounds (I), for example oligomers, or even polymers.

Advantageously, the compounds (I) used in step (E) of the process of the invention are diisocyanate compounds, preferably corresponding to the following formula (I-1):

$$O=C=N-R^I-N=C=O \quad (I-1)$$

in which $R^I$ is an alkylene, cycloalkylene or arylene group, or a divalent group containing a linking of these groups.

When $R^I$ is an alkylene group, it comprises a linear or branched hydrocarbon chain, preferably comprising from 1 to 16 carbon atoms, for example from 2 to 10 and typically approximately 6 carbon atoms. Examples of these groups include, in particular, the methylene, hexamethylene, methylpentamethylene or 2,4,4-trimethylhexamethylene group.

When $R^I$ is a cycloalkylene group, it is preferably a saturated carbon cycle, generally having 5 or 6 carbon atoms in the cycle, for example a 4-cyclohexylene, or a methylcyclohexylene, said cycloalkylene optionally being substituted by 1 to 4 substituents.

When $R^I$ is an arylene group, it is preferably an optionally substituted phenylene or naphthylene. Examples of preferred arylene groups include the phenylene, tolylene or xylene group, and more specifically the following divalent aromatic groups:

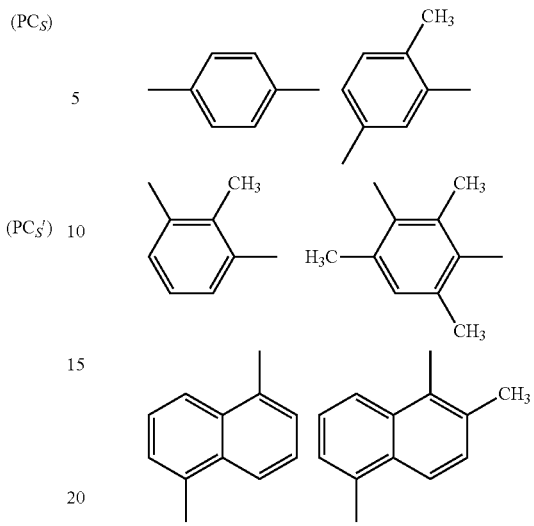

When a substituent is present on the above cycloalkylene and arylene groups, said substituent may be selected independently of any other substituents which may be present, provided it does not affect the reaction. Any substituents present are preferably and advantageously selected from an alkyl or alkoxy group having from 1 to 4 carbon atoms (preferably a methyl, ethyl or methoxy group), a halogen atom (fluorine, chlorine, bromine, iodine, preferably fluorine), and a perfluoroalkyl group, preferably a $C_1$ to $C_2$ perfluoroalkyl group (advantageously a trifluoromethyl group).

The group $R^I$ may also be selected from the following linkings of alkylene and cycloalkylene groups:

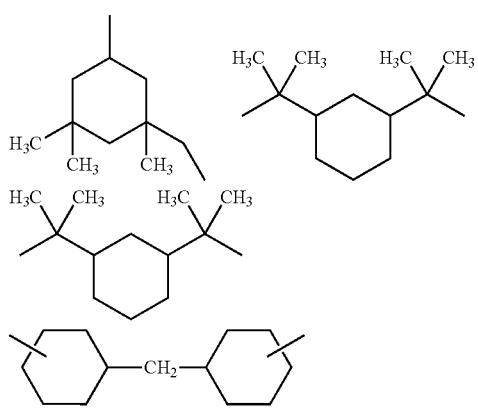

$R^I$ may also comprise a linking of aromatic groups, in particular of biphenyl groups which are optionally separated by an alkylene or alkylidene group having from 1 to 4 carbon atoms or by a heteroatom, preferably oxygen, or a functional group, preferably a carbonyl group, that is to say the phenyl groups possibly carrying substituents. Illustrative examples include the following divalent groups:

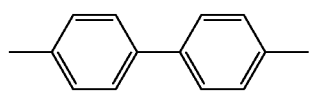

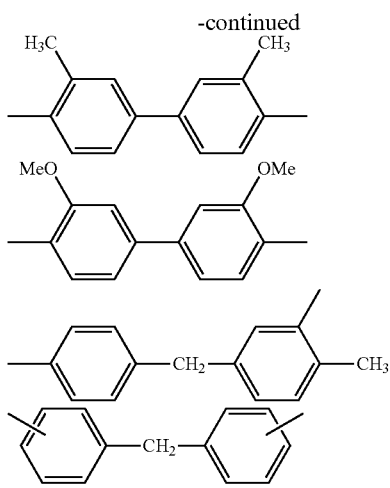

where, in the last formula, the valences are in position 2,2', 2,4', 3,4' and 4,4', preferably in position 4,4'.

Specific, examples of compounds (I) suitable within the scope of the present invention include the following:
toluene diisocyanate (TDI),
isophorone diisocyanate (IPDI),
hexamethylene diisocyanate (HDI),
diphenylmethane diisocyanate (MDI),
dicyclohexylmethane diisocyanate (DCI),
naphtalene 1,5-diisocyanate (NDI),
p-phenylene diisocyanate (PPDI),
3,3'-dimethyldiphenyl-4,4'-diisocyanate (DDDI),
4,4'-dibenzyl diisocyanate (DBDI).

Although not generally necessary within the scope of the present invention, it is possible, in accordance with some specific embodiments, that all or some of the isocyanate functional groups carried by the compounds 5i) may be introduced into the reaction medium in a masked form which is then converted in situ into isocyanate, generally by heating to temperatures of approximately 50 to 170° C. The use of isocyanate in masked form enables greater control of reactivity.

The isocyanate functional groups may be masked by well-known methods described, in particular, in *Waterborne & Solvent Based Surface Coatings and their Applications*", ISBN 0471 078868, Volume III: *Polyurethanes*, P. Ardaud, E. Charrière-Perroud, C. Varron, edited by P. Thomas, and published in 1998 by SITA Technology Ltd. For example, cyclised diisocyanate dimers or trimers in the form of isocyanurates may be used as a masked form of isocyante, or else the isocyanate functional of said isocyanurates may be protected by reaction with a phenol, oxime, caprolactam, imidazoline, tetrahydropyrimidine, imidazole, or else a pyrazole compound.

Organic Hydroxyl Compounds (II):

In this case also, it is generally preferred to use solubilisable compounds (II) of low molecular weight. However, in some specific embodiments it is also conceivable to use larger molecules as compounds (II), for example oligomers or even polymers, for example acrylic polyol polymers, polyol polyesters, or polyol polyethers, wherein these polymers do not preferably have to comprise chemical functional groups likely to react detrimentally on the carbenes used as a catalyst.

The compounds (II) used in step (E) of the process of the invention usually carry primary alcohol, secondary alcohol, tertiary alcohol and/or phenol functional groups. Generally, it is preferred for the compounds (II) to carry at least one primary or secondary alcohol group, advantageously a primary alcohol group.

Within the scope of preparing polyurethanes, the compounds (II) used in accordance with the invention usually carry at least two OH functional groups. In this case, diols are advantageously used as the compound (II), preferably selected from glycol, propanediol, butanediol or else an unbranched polyethylene glycol.

Regarding the specific preparation of three-dimensional insolubilisable polyurethanes, it is possible and advantageous to use triols or polyols as compounds (II), in particular glycerol, a branched PEG (having a star-shaped structure and at least three branches), trimethylolpropane, or pentaerythritol.

Conditions for Carrying Out Step (E)

In step (E) of the process of the invention, the NCO:OH molar ratio, which corresponds to the amount of isocyanate functional groups introduced relative to the amount of alcohol functional groups introduced, is generally between 0.8 and 1.2, this ratio preferably being greater than or equal to 1. In particular, stoichiometry may be used with a ratio equal to 1.

Furthermore, the carbene:NCO molar ratio, which corresponds to the amount of carbene introduced relative to the amount of isocyanate functional groups introduced, is generally between 0.0001 and 0.005, typically between 0.0002 and 0.002, more preferably between 0.0005 and 0.0015.

Step (E) of the process of the invention is typically carried out in an organic solvent medium, in particular when it is a polymerisation step. Naturally, the solvent used in this case does must not be able to affect the stability or efficacy of the carbene, and it is preferably polar. It is consequently preferred to carry out step (E) in a solvent selected from an aliphatic ether, for example THF, or dioxane or mixtures thereof. It is also possible to use other organic solvents, such as toluene, chlorinated hydrocarbons (in particular $CH_2Cl_2$ or $CHCl_3$), or anisole, either alone or in combination, and optionally mixed with an aliphatic ether of the aforementioned type.

The concentration of reactants in the reaction medium of step (E) may vary to a fairly great extent. Typically, an initial dry extract is used which comprises between 5 and 80%, for example from 10 to 70%, and more specifically from 20 to 60% of the reaction medium.

Furthermore, step (E) is usually carried out in an inert atmosphere, in particular by limiting the presence of water and oxygen in the reaction medium as far as possible.

Step (E) is generally carried out at atmospheric pressure, one of the advantages of the process being that pressurisation is not generally necessary. However, it is possible to carry out the process under pressure, for example between 2 and 10 bar.

In accordance with a more specific feature, the polyurethane-based polymer compositions obtained in accordance with the process of the invention constitute another object of the invention.

Especially, these compositions differs from those obtained from organometallic catalysts used in the prior art in that they are substantially free of metal species, the compositions obtained in accordance with the invention usually containing no metal species, not even traces thereof, which is generally advantageous, in particular in applications such as industrial varnishes and paints.

The polyurethane-based polymer compositions obtained within the scope of the present invention typically have a mean molecular mass greater than 500 g/mol, and usually greater than 1,000 g/mol, for example greater than 5,000 g/mol.

In the case of linear, soluble polyurethanes, said mean molecular mass is generally between 500 and 100,000 g/mol, and usually from 1,000 to 50,000 g/mol.

The polyurethane-based polymer compositions obtained within the scope of the present invention have beneficial applications within the field of formation of protective coatings (specifically the formation of protective films), in particular within the field of formulation of paints and varnishes.

Various features and advantages of the invention will become clearer upon reading the following illustrative examples.

EXAMPLES

In the following examples, polyurethane synthesis reactions were carried out using the process of the invention and using 1,3-di-tert-butylimidazol-2-ylidene as a carbene. The results obtained reveal that the carbene acts as a catalyst for the reaction of polymerisation.

The Carbene Used

The 1,3-di-tert-butylimidazol-2-ylidene used in the examples below corresponds to the following formula:

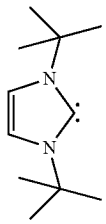

This carbene was obtained by the protocol described in the *Journal of Organometallic Chemistry*, vol. 617-618, pp. 242-253 (2001), starting from a 1,3-diterbutylimidazolium chloride as obtained by the protocol described in the *Journal of the American Chemical Society*, vol. 127, pp. 3516-3526 (2005). More specifically, the carbene was prepared in accordance with the following protocol (carried out in a Schlenk tube in an inert atmosphere. The glass equipment used was dried by heating under vacuum before use. The different solvents used were dried and distilled before use):

Synthesis of the 1,3-diterbutylimidazolium Chloride Precursor

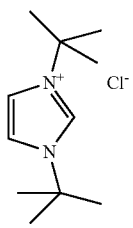

3 g (100 mmol) of paraformaldehyde and 100 mL of toluene were placed in a round-bottom flask at 0° C.

21.2 mL (i.e. 200 mmol) of terbutylamine were added dropwise to the medium with stirring at 0° C., and stirring was continued for 10 minutes.

25 mL of a solution of hydrochloric acid 4N were then added dropwise, very slowly to the dioxane, still keeping the medium at 0° C. and with stirring. The medium was then left under these conditions for 30 minutes.

After 30 minutes of stirring at 0° C., the temperature of the reaction medium had returned to ambient temperature (25° C.). 11.5 mL of glyoxal in the form of a 40% solution in water (that is to say 100 mmol of glyoxal) were then added dropwise to the medium, still with stirring. The medium was continuously stirred for the next 16 hours.

The water was then removed using a Dean Stark and the volatile solvents were removed under reduced pressure.

15 g of a brown solid (1,3-diterbutylimidazolium chloride including traces of tertbutylammonium chloride) were thus obtained, said solid having the following characteristics:

| NMR $^1$H (CDCl$_3$), δ (ppm): | 10.49 (tr, 1H, J = 1.7 Hz); 7.45 (d, 2H, J = 1.7 Hz); 1.73 (s, 18H). |
|---|---|

Synthesis of the Carbene from the Precursor 2 g (i.e. 9.22 mmol) of the precursor, prepared in the previous step (1,3-diterbutylimidazolium chloride), and then 15 mL of tetrahydrofurane (THF) were placed in a Schlenk tube.

The reaction medium was then brought to −78° C., and 8.7 mL of a 1.6 M solution of n-BuLi in hexane (i.e. 13.8 mmol of n-BuLi) were added dropwise at this temperature.

The reaction medium was then stirred at −78° C. for 30 minutes and left to return to ambient temperature (20° C.). The medium was then stirred continuously at ambient temperature for 2 hours until gassing was complete.

The medium was then placed under vacuum in order to remove the volatile compounds, and the carbene was purified by sublimation, which led to the recovery of 1.4 g of a white, crystalline powder (yield: 84%) having the following characteristics:

NMR $^1$H(C$_6$D$_6$), δ (ppm): 6.77 (s, 2H, CH); 1.51 (s, 18H, t-Bu).

NMR $^{13}$C (C$_6$D$_6$), δ (ppm): 212.2 (carbene); 11.47; 55.5 31.1.

After synthesis, the carbene was stored in a glove box in an inert argon atmosphere.

The carbene thus obtained was used to prepare polyurethanes from:
- toluene diisocyate (TDI) or isophorone diisocyanate (IPDI); and
- butane-1,2-diol (BD) or poly(ethylene glycol) (that is to say α,ω-bis-hydroxy-poly(ethylene oxide)), having a molar mass equal to 600 g/mol (PEG 600), under the conditions described in the examples below.

All the examples were carried out under slight static vacuum in glass Schlenk apparatus immersed in an oil bath preheated to the desired temperature. The polymerisation solvent used was tetrahydrofurane (THF).

Before each polymerisation process, the monomers and the THF were distilled over CaH$_2$ and stored in nitrogen in graduated tubes. The polymerisation reactor containing a magnetic stir bar was previously dried by torch flame and transferred to a glove box.

The required amount of carbene was removed in the glove box and placed in a Schlenk apparatus.

The polymerisation reaction was carried out in all instances by leaving the carbene and monomer mixture at the working temperature and with continuous magnetic stirring.

After the reaction, the polymer obtained was recovered by precipitation in pentane.

Conversion of monomers was analysed by gravimetry. In each case the mean molar mass $M_n$ (g·mol$^{-1}$) is expressed as a polystyrene equivalent and was determined by size exclusion chromatography (SEC). In the majority of the examples described below, multimodal distribution of molar mass was observed. The $M_n$ values mentioned in these examples correspond to the majority population observed in SEC. The NMR $^1$H and NMR $^{13}$C spectra of the polymers were established using a 400 MHz apparatus (Bruker AC400) and using DMSO-d$_6$ as a solvent.

In examples 8 and 9, the disappearance of isocyanate functional groups and the appearance of carbonyl functional groups of the polymer formed were also monitored continuously by infrared (IR) using a Remspec optical fibre having a zinc-selenium-based coating plunged directly into the reaction medium. A probe connected to a Bruker Vector 22 mid-IR spectrometer equipped with OPUS software was used, and the data was then reprocessed using GRAMS/32 software. The spectra were recorded with an interval of 35 seconds between two accumulations.

EXAMPLES

Example 1

Synthesis of a Polyurethane from TDI and BD (t=1 h30)

In a glove box filled with argon, 1.5 mg (6.9×10$^{-6}$ mol) of the carbene 1,3-di-tert-butylimidazol-2-ylidene and 1 mL of dry THF were placed in a first 10 mL Schlenk tube. The Schlenk tube was then removed from the glove box and connected to a vacuum/nitrogen manifold.

10 mL of THF, 0.628 g (6.9×10$^{-3}$ mol) of BD and 1.21 g of TDI (6.9×10$^{-3}$ mol) were placed in a new 100 mL Schlenk tube equipped with a magnetic stir bar using a syringe. Said second Schlenk tube was then placed in an oil bath preheated to 50° C. and the reaction medium was then stirred with slight overpressure of nitrogen for 1 h.

The carbene contained in the first Schlenk tube was then placed in the second Schlenk tube and the reaction medium thus formed was stirred for 1 h 30 at 50° C.

After precipitation of the solution by pentane, filtration and drying under vacuum, a polymer with a molar mass $M_n$ equal to 4700 g/mol (Ip=3.18) was obtained, of which the characterisation by IR reveals, in particular, the presence of peaks at 3386 cm$^{-1}$ (NH) and 1703 cm$^{-1}$ (CO). The characterisation by NMR $^1$H and $^{13}$C makes it possible to identify the peaks, respectively, at 8.8-9.6 ppm (NH) and at 153.9 ppm (NH-COO).

Example 2

Synthesis of a Polyurethane from IPDI and BD (t=4 h)

4.3 mg of carbene 1,3-di-tert-butylimidazol-2-ylidene (2.38×10-5 mol) were weighed in a glove box into a 100 mL Schlenk tube equipped with a magnetic stir bar. The Schlenk tube was then removed from the glove box and connected to a vacuum/nitrogen manifold.

7 mL of THF were added and the reactor was placed in an oil bath preheated to 50° C. 0.4305 g of BD (4.78×10$^{-3}$ mol) and 1.062 g of IPDI (4.78×10$^{-3}$ mol) were then added using a syringe.

The reaction medium was then stirred with slight overpressure of nitrogen for 4 h.

After precipitation of the solution by pentane, filtration and drying under vacuum, a polymer with a molar mass $M_n$ equal to 3545 g/mol was obtained, of which the characterisation by IR reveals, in particular, the presence of peaks at 3324 cm$^{-1}$ (NH) and 1705 cm$^{-1}$ (CO). The characterisation by NMR $^1$H and $^{13}$C makes it possible to identify the peaks, respectively, at 6.96 ppm (secondary NH), at 156.9 ppm (NHCOO$_{primary\ NCO}$) and at 155.46 ppm (NHCOO-$_{secondary\ NCO}$).

Example 3

Synthesis of a Polyurethane from IPDI and BD (t=5 h)

The same protocol as in Example 2 was used (placement of 4.3 mg of carbene and then of 7 mL of THF, 0.4305 g of BD, and lastly 1.062 g of IPDI in a Schlenk tube).

However, the polymerisation reaction was carried out for longer, that is to say the reaction medium was stirred for 5 h.

The polymer recovered after precipitation by pentane has a molar mass $M_n$ equal to 3623 g/mol and the characterisation thereof by IR reveals, in particular, the presence of peaks at 3322 cm$^{-1}$ (NH) and 1710 cm$^{-1}$ (CO). The characterisation by NMR $^1$H and $^{13}$C makes it possible to identify the peaks, respectively, at 6.96 ppm (secondary NH), at 156.9 ppm (NHCOO$_{primary\ NCO}$) and at 155.47 ppm (NHCOO-$_{secondary\ NCO}$).

Example 4

Synthesis of a Polyurethane from IPDI and BD (t=7 h)

The protocol of Example 2 was repeated (placement of 4.3 mg of carbene and then of 7 mL of THF, 0.4305 g of BD, and lastly 1.062 g of IPDI in a Schlenk tube), but this time the reaction time was 7 h.

The polymer recovered after precipitation by pentane has a molar mass $M_n$ equal to 3782 g/mol and the characterisation thereof by IR reveals, in particular, the presence of peaks at 3322 cm$^{-1}$ (NH) and 1710 cm$^{-1}$ (CO). The characterisation by NMR $^1$H and $^{13}$C makes it possible to identify the peaks, respectively, at 6.96 ppm (secondary NH), at 156.9 ppm (NHCOO$_{primary\ NCO}$) and at 155.42 ppm (NHCOO-$_{secondary\ NCO}$).

Example 5

Synthesis of a Polyurethane from IPDI and PEG 600 (t=4 h)

In accordance with the same protocol as in Example 2, the Schlenk tube containing 4.3 mg of carbene 1,3-di-tert-butyl-imidazol-2-ylidene (2.38×10$^{-5}$ mol), 7 mL of THF, 0.4305 g of PEG600 (4.78×10$^{-3}$ mol) and 1.062 g of IPDI (4.78×10$^{-3}$ mol) was placed in an oil bath preheated to 50° C. for 4 h.

After recovery as stated above, a polymer was obtained having a molar mass $M_n$ equal to 8700 g/mol (Ip=1.68) and of which the characterisation by IR reveals, in particular, the presence of peaks at 3322 cm$^{-1}$ (NH) and 1710 cm$^{-1}$ (CO). The characterisation by NMR $^1$H and $^{13}$C makes it possible to identify the peaks, respectively, at 6.96 ppm (secondary NH), at 156.9 ppm (NHCOO$_{primary\ NCO}$) and at 155.42 ppm (NHCOO-$_{secondary\ NCO}$).

Example 6

Synthesis of a Polyurethane from IPDI and BD (t=6 h)

The protocol of Example 2 was again repeated (placement of 4.3 mg of carbene, then of 7 mL of THF, 0.4305 g of BD, and lastly 1.062 g of IPDI in a Schlenk tube, but this time the reaction time was 6 h.

The polymer recovered after precipitation by pentane has a molar mass $M_n$ equal to 3977 g/mol and the characterisation thereof by IR reveals, in particular, the presence of peaks at 3326 cm$^{-1}$ (NH) and 1705 cm$^{-1}$ (CO). The characterisation by NMR $^1$H and $^{13}$C makes it possible to identify the peaks, respectively, at 6.92 ppm (secondary NH), at 156.9 ppm (NH-COO$_{primary\,NCO}$) and at 155.42 ppm (NHCOO-$_{secondary\,NCO}$).

Example 7

Synthesis of a Polyurethane from IPDI and BD—Followed by IR Spectrometry

In a glove box filled with argon, 4.3 mg (2.38×10$^{-6}$ mol) of the carbene and 2 mL of THF were introduced into a 10 mL Schlenk tube. The Schlenk tube was then removed from the glove box and connected to a three-necked flask equipped with a magnetic stir bar and in turn connected to a vacuum/nitrogen manifold.

An IR probe was placed in said reactor via one of the necks.

5 mL of THF were then placed in the three-necked flask, followed by 0.4305 g of BD (4.78×10$^{-3}$ mol) and lastly 1.062 g of IPDI (4.78×10$^{-3}$ mol).

The three-necked flask containing the reaction mixture was then placed in an oil bath preheated to 50° C. for 7 h.

The polymer recovered after precipitation by pentane has a molar mass $M_n$ equal to 3783 g/mol and the characterisation thereof by IR reveals, in particular, the presence of peaks at 3326 cm$^{-1}$ (NH) and 1705 cm$^{-1}$ (CO). The characterisation by NMR $^1$H and $^{13}$C makes it possible to identify the peaks, respectively, at 6.92 ppm (secondary NH), at 156.9 ppm (NH-COO$_{primary\,NCO}$) and at 155.42 ppm (NHCOO-$_{secondary\,NCO}$).

Comparative Example

Contacting IPDI with BD in the Absence of a Catalyst

The protocol of Example 8 was repeated, but without the introduction of a carbene to the medium, that is to say 0.4305 g of BD (4.78×10$^{-3}$ mol) was reacted with 1.062 g of IPDI (4.78×10$^{-3}$ mol) in a three-necked flask equipped with a magnetic stir bar and with the IR probe. The reaction mixture was then placed in an oil bath preheated to 50° C. for 4 h.

Under these conditions, neither the formation of a polymer under IR spectrometry, nor a peak characteristic of the formation of urethane bonds was observed.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A process for preparing a compound comprising at least a urethane group —HN—C(=O)—O, said process comprising a step (E) wherein a compound (I) carrying two isocyanate functional groups —N=C=O is reacted with an organic compound (II) carrying two hydroxyl groups —OH, this reaction being carried out in the presence of a heterocyclic carbene (III) catalyst, the molar ratio of carbene (III) to isocyanate functional groups being 0.0001 to 0.05, and at 10 to 80° C.

2. The process of claim 1, wherein step (E) comprises the addition of a compound (I) carrying precisely two isocyanate groups to a starter in which a compound (II) carrying precisely two OH has previously been mixed with a carbene (III), the carbene:NCO molar ratio is 0.0001 to 0.002.

3. The process according to claim 2, wherein the carbene:NCO molar ratio is 0.0001 to 0.0015.

4. The process of claim 2, wherein step (E) is carried out between 10° C. and 40° C.

5. The process according to claim 1, wherein the process comprises a step (E°) prior to step (E), wherein compound (I) is reacted with compound (II) in the absence of carbene, step (E) then being carried out by adding the carbene (III) to the medium obtained at the end of step (E°), optionally with the joint addition of additional diisocyanate and/or organic diol, which may be the same as or different from those used in step (E°).

6. The process of claim 5, wherein in step (E°) the compounds (I) and (II) are present in a NCO:OH molar ratio greater than 1 and, in step (E), an organic diol which is different from the compound (II) used in step (E°) is added.

7. The process of claim 1, wherein the carbene (III) corresponds to the general formula (III-1) below:

where:
- X and Y are the same or different and are heteroatoms selected from N, S, P, Si and O;
- nx and ny are two integers which are respectively equal to the valence of the heteroatom X and the valence of the heteroatom Y;
- each of the groups $R^X$ and $R^Y$ linked to the heteroatoms X and Y represents, independently of the other groups, a hydrocarbon chain which is linear or branched, optionally cyclised in part or completely, and optionally substituted, this chain preferably being:
    - a linear or branched alkyl, alkenyl or alkynyl group which substituted, by a perfluoroalkyl group, or another group, or which is not substituted;
    - a linear or branched perfluoroalkyl group;
    - a cycloalkyl group which is substituted, for example by at least an alkyl or alkoxy group;
    - an aryl group which is optionally substituted, by at least an alkyl or alkoxy group; or
    - another group, or which is not substituted;

an alkylaryl or arylalkyl group in which the aryl portion is substituted, by at least an alkyl or alkoxy group or another group, or which is not substituted;

wherein one of the groups $R^X$ carried by the heteroatom X and one of the groups $R^Y$ carried by the heteroatom Y may optionally be joined together to form a heterocycle with the heteroatoms X and Y and the divalent carbon carrying two non-bonding electrons.

8. The process of claim 7, wherein X denotes a nitrogen atom.

9. The process of claim 7, wherein the carbene (III) has one of the following general formulae (III-1.1) or (III-1.1'):

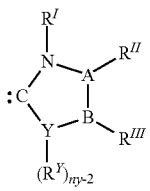
(III-1.1)

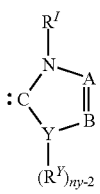
(III-1.1')

where:
Y is a heteroatom selected from N, S, P, Si and O,
ny and $R^Y$ are as defined in claim 12; and
$R^I$ denotes a hydrocarbon chain which is linear or branched, optionally cyclised in part or completely, and optionally substituted,
A denotes a nitrogen atom or a $CR^{IIa}$ group;
B denotes a nitrogen atom or a $CR^{IIIa}$ group;
$R^{II}$ and $R^{III}$, and optionally $R^{IIa}$ and $R^{IIIa}$ which may the same or different, each denote a hydrogen atom or a hydrocarbon chain which is linear or branched, optionally cyclised in part or completely, and optionally substituted.

10. The process of claim 1, wherein the carbene (III) is a carbene which has been preformed prior to step (E).

11. The process of claim 1, wherein the carbene (III) is formed in situ in the medium of step (E) from at least a precursor (PC) of said carbene, said precursor being:
a carbene in dimerised form which is split into two carbenes in situ by thermal activation, said dimerised carbene advantageously corresponding to the following formula ($PC_D$):

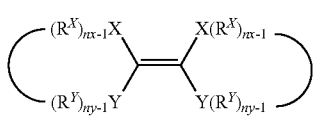
($PC_D$)

wherein X, Y, nx, ny, $R^X$ and $R^Y$ are as defined in claim 12; or an imidazolium salt, which forms a carbene in situ by reaction with a base, said imidazolium salt advantageously corresponding to one of the following formulae ($PC_S$) or ($PC_S'$):

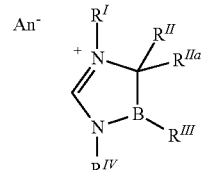
($PC_S$)

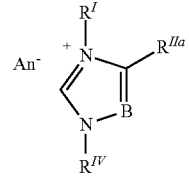
($PC_S'$)

where:
B, $R^I$, $R^{II}$, $R^{III}$ and $R^{IV}$ are as defined in claim 15; and
An⁻ is an anion derived from a Brönsted acid, advantageously a carboxylate, sulfate, hydrogen sulfate, sulfonate, phosphate, hydrogenphosphate, halide, perchlorate or borate anion;

carbene and alcohol complex which releases the carbene in situ when thermally treated.

12. The process of claim 1, wherein the carbene (III) is an encapsulated carbene mixed physically with a polymer which provides a protective matrix.

13. The process of claim 1, wherein the compound (I) comprising two isocyanate functional groups —N═C═O used in step (E) has the following formula (I-1):

$$O═C═N-R^I-N═C═O \quad (I-1)$$

where $R^I$ is an alkylene, cycloalkylene or arylene group, or a divalent group containing a linking of these groups.

14. The process according to claim 13, wherein the compound (I) comprising two isocyanate functional groups —N═C═O used in step (E) is selected from:
toluene diisocyanate (TDI),
isophorone diisocyanate (IPDI),
hexamethylene diisocyanate (HDI),
diphenylmethane diisocyanate (MDI),
dicyclohexylmethane diisocyanate (DCI),
naphtalene 1,5-diisocyanate (NDI),
p-phenylene diisocyanate (PPDI),
3,3'-dimethyldiphenyl-4,4'-diisocyanate (DDDI), and
4,4'-dibenzyl diisocyanate (DBDI).

15. The process of claim 1, wherein the organic compound (II) carrying two hydroxyl groups —OH used in step (E) carries at least a primary or secondary alcohol group.

16. The process of claim 1, wherein the compound (II) used in step (E) is a diol selected from glycol, propanediol, butanediol or an unbranched polyethyleneglycol.

17. The process of claim 8 wherein Y is a nitrogen atom.

18. The process according to claim 17, wherein the carbene (III) corresponds to the following general formula (III-1.1a) or (III-1.1a'):

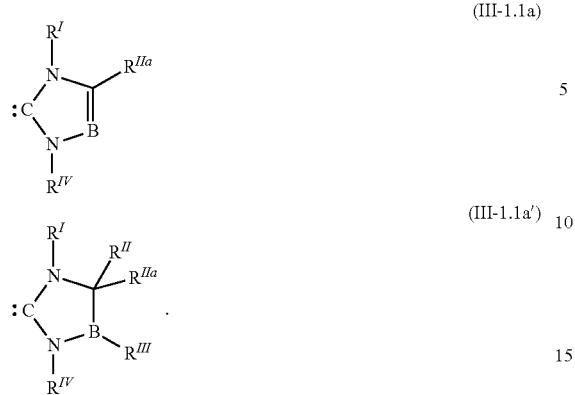
(III-1.1a)
(III-1.1a′)
19. The process of claim 18, wherein the carbene (III) has the general formula (III-1.1a).

UNITED STATES PATENT AND TRADEMARK OFFICE
CERTIFICATE OF CORRECTION

PATENT NO. : 8,759,469 B2  
APPLICATION NO. : 12/670298  
DATED : June 24, 2014  
INVENTOR(S) : Gerard Mignani et al.

It is certified that error appears in the above-identified patent and that said Letters Patent is hereby corrected as shown below:

Title page, (75), The first Inventors' address reading "Gerard Mignani, Lyons (FR)" should read --Gerard Mignani, Lyon (FR)--

In the Claims

Column 25, line 35, Claim 9 reading "as defined in claim 12" should read --as defined in claim 7--

Column 25, line 62, Claim 11 reading "as defined in claim 12" should read --as defined in claim 7--

Column 26, line 21, Claim 11 reading "as defined in claim 15" should read --as defined in claim 9--

Signed and Sealed this  
Twenty-eighth Day of July, 2015

Michelle K. Lee  
*Director of the United States Patent and Trademark Office*